United States Patent [19]

Bowditch

[11] Patent Number: 4,507,461

[45] Date of Patent: Mar. 26, 1985

[54] LOW VISCOSITY EPOXY RESINS

[75] Inventor: W. Raymond Bowditch, West Chester, Pa.

[73] Assignee: Wilmington Chemical Corporation, Wilmington, Del.

[21] Appl. No.: 541,954

[22] Filed: Oct. 14, 1983

[51] Int. Cl.³ .................. C08G 59/02; C08G 59/24
[52] U.S. Cl. .................................. 528/104; 525/507
[58] Field of Search .............. 528/87, 104; 525/507

[56] References Cited

U.S. PATENT DOCUMENTS

| | | | |
|---|---|---|---|
| 2,925,403 | 2/1960 | Shokal | 260/47 |
| 3,033,803 | 5/1962 | Price et al. | 528/87 X |
| 3,033,820 | 5/1962 | Price et al. | 260/47 |
| 3,138,618 | 6/1964 | Nikles et al. | 260/348 |
| 3,373,135 | 3/1968 | Jenkner et al. | 528/89 X |
| 3,374,204 | 3/1968 | Masters et al. | 528/110 X |
| 3,379,653 | 4/1968 | Ernst et al. | 260/2 |
| 3,444,111 | 5/1969 | Hickner | 260/18 |
| 3,470,110 | 9/1969 | Renner | 260/2 |
| 3,477,990 | 11/1969 | Dante et al. | 260/47 |
| 3,547,881 | 12/1970 | Mueller | 260/47 |
| 3,838,175 | 9/1974 | Berther et al. | 260/348 R |
| 3,932,689 | 1/1976 | Watanabe et al. | 525/108 X |
| 4,119,593 | 10/1978 | Smith et al. | 260/18 EP |

Primary Examiner—Earl A. Nielsen
Attorney, Agent, or Firm—Webb, Burden, Robinson & Webb

[57] ABSTRACT

A difunctional epoxide is provided which is represented by the structural formula:

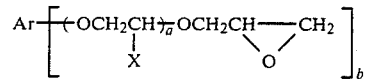

wherein Ar is an aromatic residue, a is 1 to 2, b is at least 2 and most preferably 2, and x is $-CH_3$, $-H$, or $-CH_2-CH_3$, and most preferably x is $-CH_3$.

In addition, an epoxy resin is provided which is comprised of the reaction product of the above diepoxide and a polyfunctional phenolic hydroxy compound represented by the structural formula:

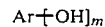

wherein Ar is an aromatic residue and m is at least and preferably 2. The resultant reaction product is at least difunctional in epoxide groups.

7 Claims, No Drawings

LOW VISCOSITY EPOXY RESINS

BACKGROUND OF THE INVENTION

1. Field of the Invention

This invention relates to epoxy resins, and more particularly, diepoxides and reaction products thereof.

2. Description of the Prior Art

Epoxy resins and polyfunctional epoxide compounds have found extensive utility in the field of coating, molding and the like. These polyfunctional epoxides and epoxy resins include the reaction products of dihydric phenols and halohydrins with subsequent dehydrohalogenation to produce epoxides tailored for particular purposes. Undoubtedly, the two types of epoxides which have been found to have the broadest range of properties useful in a plurality of applications are those based upon bisphenol A and epichlorohydrin and those based upon the condensation products of formaldehyde and phenol with subsequent epoxidation with epichlorohydrin. Those epoxy resins which are based upon the epoxidized phenol-formaldehyde condensation products are commonly referred to as novolak resins, and those based upon bisphenol A and epichlorohydrin are known as the Epon ® resins which are manufactured by Shell Chemical Company.

These novolak and Epon resins vary in molecular weight and epoxide equivalent, with these factors being determinative of particular applications for their use.

In most cases, these specific epoxides, even with additional modifications, are limited in one way or another in their applicability to only a narrow range of uses. One determinative factor in selecting an epoxide for a particular use is viscosity. The viscosity of a particular epoxide to a large degree limits the uses to which the epoxide can be made. In the manufacture of coatings, as an example, it is undesirable to use coating formulations which have ranges of viscosity which are either so low that the formulation flows off the surface being coated or so high that it is difficult to apply without the addition of heat and without encountering rheological problems.

Similarly, in applications such as casting, molding or bonding parts and the like, it is desirable to have a relatively low viscosity epoxide which quickly and completely fills mold and interstices. Further, low viscosity formulations are capable of accepting larger amounts of fillers, pigments and the like over higher viscosity epoxies.

Still further, with present environmental constraints upon the use of volatile solvents, it has been a goal in the coating industry to eliminate the use of such solvents and utilize 100 percent solids systems. Such systems are practical when the viscosity of the 100 percent solids systems, i.e. in this instance the epoxy resin, is relatively low.

When epoxy resins are used in molding, casting and the like where thick masses of cured epoxy resin or polyfunctional epoxide are produced, it is necessary to have a 100 percent non-volatile content in the resin or polyepoxide since it is difficult for solvents and the like to be released from the mass during curing, which often results in voids within the mass which are undesirable. Likewise, when epoxies are used for bonding parts as thermoset adhesives, it is desirable to have a 100 percent reactive system without the addition of solvents.

Although many polyepoxides and epoxy resins have been synthesized from various starting materials resulting in aliphatic, alicyclic and phenolic polyepoxides and epoxy resins, by far the most widely used epoxides on a commercial basis have been the Epon and novolak type resins due to their cost and final physical properties for particular applications.

The primary disadvantages of these Epon and novolak type resins are that they have high viscosities relative to molecular weight and require diluents or environmental modifications during application, such as heat and the like, to be used for particular applications.

In order to alleviate this disadvantage, workers in the art have provided reactive diluents such as low molecular weight mono- and polyepoxides which act as a viscosity reducer for the phenolic-based epoxy resins and which react within the system to form 100 percent solids coating and molding resins.

In many instances, these low viscosity diluents are formed by the peroxidation of ethylenically unsaturated materials. Further, other low viscosity epoxides have been produced by the epoxidation of alcohols, diols and polyols with epichlorohydrin.

Exemplary of various epoxy resins and polyepoxides which have been used as reactive diluents and also as reactive compositions alone are those disclosed in U.S. Pat. Nos. 2,925,403; 3,444,111; 3,470,110; 3,477,990; 3,547,881; 3,838,175; 4,119,593; 3,138,618; 3,033,820 and 3,379,653. Most of these epoxides which are of low viscosity and having been used as diluents are the alicyclic epoxides which are formed by the peroxidation of cycloalkenes.

While it is recognized that the epoxy group can be catalyzed and is reactive with amines, carboxylic acids, Lewis acids and the like, different epoxides function differently in these environments. For example, it is recognized that the phenolic-based epoxides are more highly reactive with amines and quaternary ammonium salts than are the alicyclic epoxides, whereas the alicyclic epoxides are more reactive with Lewis acids and carboxylic acids than the phenolic epoxides.

Thus, when a low molecular weight functional epoxide is used as a reactive diluent with a phenolic epoxide, there may be difficulty in obtaining a complete reaction among the epoxides in the composition because of the difference in catalysis and crosslinking rate.

In accordance with the present invention, a low molecular weight diepoxide is provided which is useful as the sole epoxy constituent in forming coatings, moldings and the like and is further useful as a reactive diluent for phenolic epoxides. In addition, the difunctional epoxide in accordance with the invention, when copolymerized with phenolic compounds upon which epoxy resins are normally based, is effective in reducing the viscosity of the final epoxy resins while not deteriorating and sometimes enhancing the final properties of the product to be formed.

BRIEF DESCRIPTION OF THE INVENTION

A difunctional epoxide is provided which is represented by the structural formula:

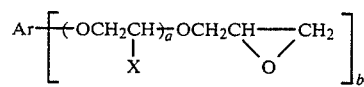

wherein Ar is an aromatic residue, a is 1 to 2, b is at least 2 and most preferably 2, and x is —CH$_3$, —H, or —CH$_2$—CH$_3$, and most preferably x is —CH$_3$.

In addition, an epoxy resin is provided which is comprised of the reaction product of the above diepoxide and a polyfunctional phenolic hydroxy compound represented by the structural formula:

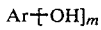

wherein Ar is an aromatic residue and m is at least and preferably 2. The resultant reaction product is at least difunctional in epoxide groups.

DETAILED DESCRIPTION OF THE INVENTION

The diepoxide which is represented by the structural formula:

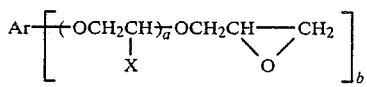

wherein Ar is an aromatic residue, a is 1 to 2, b is at least 2 and most preferably 2, and x is —CH$_3$, —H, or —CH$_2$—CH$_3$, and most preferably x is —CH$_3$, is synthesized by reacting an intermediate oxyalkylated phenolic hydroxy compound with an epihalohydrin in the presence of a suitable catalyst.

The intermediate is represented by the structural formula:

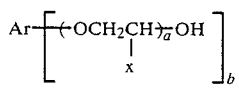

wherein Ar is an aromatic residue, a is 1 to 2, b is at least 2 and most preferably 2, and x is —CH$_3$, —H, or —CH$_2$—CH$_3$, and most preferably x is —CH$_3$. The aromatic phenolic hydroxy compound which can be represented by the structural formula:

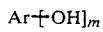

wherein Ar is an aromatic residue and m is at least and preferably 2, is reacted with ethylene, propylene or 1,2-butylene oxide at an equivalent ratio of 1 phenolic hydroxyl to 1 to 2 alkylene oxide. The reaction procedure for forming the intermediate is well known to those skilled in the art, and such materials are commercially available. The intermediate is reacted with the epihalohydrin in the presence of the catalyst to form a chlorohydrin, and the chlorohydrin is dehydrohalogenated to form the diepoxide. Typically, a stoichiometric excess of 8 to 10 percent of the epihalohydrin is used in relation to the equivalents of hydroxyl in the intermediate.

The epihalohydrins useful in the practice of the invention in forming the polyepoxide are epichlorohydrin and epibromohydrin. Epichlorohydrin is preferred. The reaction between the oxyalkylated phenolic intermediate and the epihalohydrin is done by adding a Lewis acid; then the chlorohydrin product is dehydrohalogenated by a base such as sodium hydroxide, potassium hydroxide or the like, at a concentration of 1.05 to 1.06 or greater moles of hydroxide per equivalent of chlorohydrin. The processing steps in forming epoxies from diols and epihalohydrins are well known to those skilled in the art. In another aspect of the invention, the resultant polyepoxide which is in accordance with the invention is reacted with a polyfunctional phenolic hydroxyl compound. These polyfunctional hydroxyl compounds can be represented by the structural formula Ar—OH]$_m$, as previously described. The stoichiometry is adjusted such that the reaction product is at least difunctional and thus a stoichiometry of at least 1 equivalent of the polyepoxide to 1 equivalent of polyfunctional phenolic compound is required. When higher molecular weight versions of the reaction product are desired, the OH equivalent to epoxy equivalent approaches equality, but in all instances a sufficient excess of the polyepoxide must be provided in order to have residual reactive epoxide functionality in the final resin in accordance with the invention. Thus, the range of equivalents between hydroxyl to epoxide in accordance with the invention is in the range of greater than 1 equivalent of epoxide to 1 equivalent of hydroxyl and 2 equivalents of polyepoxide to 1 of hydroxyl. Most preferably, the reactive hydroxyl is an aromatic hydroxyl.

Typical Ar—OH]$_m$ compounds can be represented by the structural formulae:

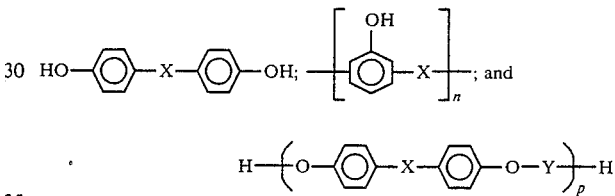

wherein X is alkylene having 1 to 3 carbon atoms, n and p are greater than 1, and Y is selected from the group consisting of:

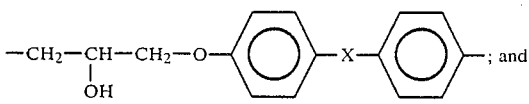

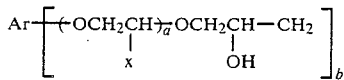

Among the polyfunctional phenolic hydroxy compounds recited above, the following are the most preferred: bisphenol A, resorcinol and bisphenol F, and novolak resins having a hydroxyl functionality of 3 to 5 and having a molecular weight range of 320 to 600 and polymeric materials which are provided by the reaction of the polyepoxide compound in accordance with the invention and the difunctional phenols such as bisphenol A and bisphenol F, wherein a copolymer is prepared having alternating bisphenolic and betahydroxylpropyl ether of the oxyalkylated aromatic phenolic compound moieties throughout the chain. In the latter instance, lower viscosities are achieved in relation to comparable molecular weight phenolic epoxides based solely on bisphenol A and epichlorohydrin.

Most preferably, the polyfunctional epoxide compound in accordance with the invention is one wherein b is 2 and the aromatic residue is based upon bisphenol A. In reacting the polyepoxide and the phenolic compound, suitable quantities of the polyepoxide and polyfunctional phenolic hydroxy compound are charged to a suitable vessel and a catalyst is added. The reaction is allowed to proceed so that an epoxy-terminated material is formed. Subsequent to the initial reaction, additional polyepoxide compound may be charged to reduce the viscosity of the final product. The reaction is conducted between 155° C. and 190° C. for 4 to 7 hours to insure complete reaction between the phenolic compound and the polyepoxide. The catalysts useful in the practice of the invention in forming the reaction product of the phenolic compound and the polyepoxide are the tertiary and quaternary ammonium salts. Typical catalysts are 2-methylimidazole, tetramethylammonium chloride, tetramethylammonium bromide, alkali hydroxides and the like. After it is determined that the desired epoxide has been formed, it is cooled to room temperature or dissolved in a solvent. These epoxies may be cured by amine or acid catalysts recognized by those skilled in the art for curing epoxy resins.

It has been found that the epoxy resins prepared in accordance with the invention are useful as 100 percent solids, coatings, moldings and the like. Additionally, epoxides which are the copolymeric epoxides, have substantially reduced viscosities over comparable epoxides synthesized from solely phenolic hydroxy compounds and epihalohydrins. Further, the epoxies prepared in accordance with the invention can be used in the formulation of coating compositions with equivalent or superior properties to those based solely on the phenolic hydroxy compounds and epihalohydrins. The following examples will more fully illustrate the invention:

EXAMPLE 1

To an appropriate vessel were charged propoxyalkylated bisphenol A at a molar ratio of 2.2 moles of propylene oxide to 1 of bisphenol A, along with 800 grams of toluene. The mixture was heated, under agitation, to 50° C. to 60° C. and 4 grams of boron trifluoride etherate were charged thereto and heated to 75° C. One hundred eighty grams of epichlorohydrin were charged to the reaction mixture over the course of 4 hours, and after the 4 hour addition 33 additional grams of epichlorohydrin were added thereto. The temperature was maintained at about 75° C. over the course of the reaction which was terminated after 5 hours total.

The temperature of the reaction was reduced to about 65° C. and sodium hydroxide 25 percent was added which dehydrohalogenated the chlorohydrin intermediate and neutralized the formed hydrochloric acid. After removal of the salt, the mixture was dried and the toluene solvent removed and subsequently filtered to yield a diglycidyl ether of propoxyalkylated bisphenol A. The weight per epoxide of the reaction product was about 335 with a viscosity of 4,300 centipoise.

EXAMPLE 2

Example 1 was repeated, except that the starting material was propoxyalkylated bisphenol A at a molar ratio of 1 bisphenol A to 4 propylene oxide. The stoichiometric ratio of epichlorohydrin and the diol was maintained as in Example 1. The product produced thereby was a diepoxide having a weight per epoxide of 375 and a viscosity of 1,800 centipoise.

EXAMPLES 3-8

The diepoxide produced in accordance with Example 1 was reacted with bisphenol A at a temperature of about 150° C. to 190° C. in the presence of 0.05 percent by weight 2-methylimidazole. The reaction was held for about 6 hours. Various ratios of bisphenol A to the polyepoxide produced in accordance with Example 1 were utilized to obtain particular weights per epoxide of the final resins. In all cases, diepoxides resulted. The viscosity and weight per epoxide are reported in Table I, along with a comparison of bisphenol A-epichlorohydrin epoxides which are described as the Epon resins.

Table I also shows the comparison between the epoxide of Example 1 and the comparable bisphenol A-epichlorohydrin epoxide.

TABLE I

| Example | Weight/Epoxide | Viscosity | Bisphenol A-Epichlorohydrin Epoxide | Weight/Epoxide | Viscosity |
|---|---|---|---|---|---|
| 1 | 335 | 4,300[1] | 828 | 185-195 | 11,000-15,000[1] |
| 3 | 450-550 | 93,000[1] | 1001 | 450-550 | D-G[2] |
| 4 | 875-975 | B-C[2] | 1004 | 850-975 | Q-U[2] |
| 5 | 1,650-2,000 | F[2] | — | 1,650-2,000 | X-Z[2] |
| 6 | 2,000-2,500 | F[2] | 1007 | 2,000-2,500 | Y-Z[2] |
| 7 | 2,500-4,000 | F+[2] | 1009 | 2,500-4,000 | Z$_2$-Z$_5$[2] |
| 8 | 4,000-6,000 | I[2] | 1010 | 4,000-6,000 | Z$_5$-Z$_7$[2] |

[1]Viscosity in Centipoise @ 100% Nonvolatile (N.V.)
[2]Gardner-Holt Viscosity 40% N.V. in Butyl Carbitol Table I illustrates that substantially lower viscosity epoxy resins are obtainable in accordance with the invention over comparable epoxy resins based solely on bisphenol A and epichlorohydrin.

EXAMPLES 9-14

Examples 3 through 8 were repeated, except that the epoxide of Example 2 was used in place of the epoxide of Example 1. The weight per epoxides and viscosities, as compared to those epoxy resins based solely on bisphenol A and epichlorohydrin, are reported in Table II. Also, the weight per epoxide and viscosity of Example 2, as compared to a comparable resin based on bisphenol A and epichlorohydrin, are also reported in Table II.

TABLE II

| Example | Weight/Epoxide | Viscosity | Bisphenol A-Epichlorohydrin Epoxide | Weight/Epoxide | Viscosity |
|---|---|---|---|---|---|
| 2 | 375 | 1,800[1] | 828 | 185-195 | 11,000-15,000[1] |
| 9 | 450-550 | 26,000[1] | 1001 | 450-550 | D-G[2] |
| 10 | 875-975 | A+[2] | 1004 | 850-975 | Q-U[2] |
| 11 | 1,650-2,000 | D-E[2] | — | 1,650-2,000 | X-Z[2] |
| 12 | 2,000-2,500 | E-F[2] | 1007 | 2,000-2,500 | Y-Z[2] |
| 13 | 2,500-4,000 | F[2] | 1009 | 2,500-4,000 | Z$_2$-Z$_5$[2] |
| 14 | 4,000-6,000 | G-H[2] | 1010 | 4,000-6,000 | Z$_5$-Z$_7$[2] |

[1]Viscosity in Centipoise @ 100% N.V.
[2]Gardner-Holt Viscosity 40% N.V. in Butyl Carbitol As can be seen from Table II, substantially lower viscosity epoxy resins are obtainable in accordance with the invention over comparable epoxy resins based solely on bisphenol A and epichlorohydrin.

EXAMPLE 15

An epoxy resin prepared in accordance with Example 6 was prepared having a weight per epoxide of 2,007, a Gardner-Holt viscosity at 40 percent N.V. in butyl carbitol of F to G and a Gardner color of 2+ was formulated into a coating composition. The coating composition was as follows: 736.8 grams of epoxy resin, 657.4 grams of xylene, 405 grams of cellosolve acetate, 202.5 grams of n-butanol, 200.2 grams of Resimene 747 aminoplast resin, 29.6 grams of DC840 and 388.6 grams of TiD$_2$ (RF30) plus 1.55 percent blocked acid catalyst. The molor ratio of epoxy to amine was 80/20 and the formulation had a Zahn 2 viscosity of 27 seconds and a Zahn 4 of 7 seconds. A film was cast on a steel panel and cured at 306° F. for 15 minutes. The testing of the films yielded the following results:

Crosshatch Adhesion—5
Forward Impact—86 inch-pounds
Reverse Impact—32 inch-pounds
Pencil Hardness—5H to gouge
Pencil Hardness—F to scratch
Sward Hardness—51

EXAMPLE 16

An epoxy resin coating composition was formulated using an epoxide based solely on bisphenol A and epichlorohydrin and sold under the trade name "Epon 1007". The weight per epoxide was 2,350. The Gardner-Holt viscosity was Z+ at 40 percent N.V. in butyl carbitol. The formulation was as follows: 718.3 grams of epoxy resin, 657.4 grams of xylene, 405 grams of cellosolve acetate, 202.5 grams of n-butanol, 303 grams of Resimene 747 aminoplast resin, 29.6 grams of DC840 silicone resin and 388.6 grams of titanium dioxide. The molar ratio of epoxy to aminoplast was 69.74/30.36. The viscosity, Zahn 2, was 120 seconds and Zahn 4, 21 seconds when 1.03 percent blocked acid catalyst was used to accelerate the cure. The coating composition was coated on a steel panel and cured at 287° F. for 15 minutes. The films were tested for physical properties and the following is a result of such testing:

Crosshatch Adhesion—5
Forward Impact—86 inch-pounds
Reverse Impact—23 inch-pounds
Pencil Hardness—5H to gouge
Pencil Hardness—F to scratch
Sward Hardness—57

As can be seen by a comparison of Examples 15 and 16, the epoxy resins prepared in accordance with the invention are comparable in properties to those based solely on bisphenol A and epichlorohydrin while there is a significant reduction in viscosity, thus providing a superior product.

Thus, although the invention has been described with reference to specific materials and specific processes, the invention is only to be limited so far as is set forth in the accompanying claims.

I claim:

1. An epoxy resin comprised of the reaction product of:

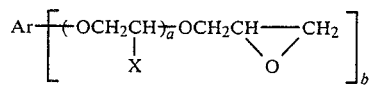

wherein Ar is an aromatic residue, a is 1 to 2, b is at least 2 and x is —CH$_3$, —H, or —CH$_2$—CH$_3$, and a polyfunctional phenolic hydroxy compound represented by the structural formula:

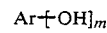

wherein Ar is an aromatic residue and m is at least 2, said reaction product being at least difunctional.

2. The epoxy resin of claim 1 wherein Ar—OH]$_m$ is selected from the group consisting of:

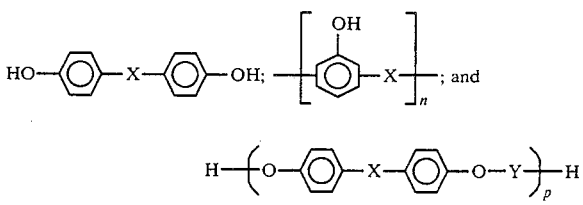

wherein X is alkylene having 1 to 3 carbon atoms, n and p are greater than 1, and Y is selected from the group consisting of:

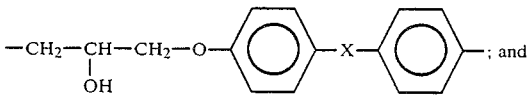

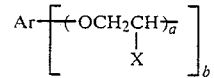

3. The polyepoxide of claim 1 wherein Ar is a bisphenol residue.
4. The polyepoxide of claim 1 wherein a is 1.
5. The polyepoxide of claim 1 wherein a is 2.
6. The polyepoxide of claim 1 wherein b is 2.
7. The polyepoxide of claim 1 wherein x is —CH$_3$.

* * * * *